United States Patent [19]

Grongstad

[11] 4,362,287

[45] Dec. 7, 1982

[54] SHOCK ABSORBER ARRANGEMENT FOR MOUNTING DELICATE EQUIPMENT AND SHOCK ABSORBER FOR USE IN THE ARRANGEMENT

[75] Inventor: Oddvar Grongstad, Kongsberg, Norway

[73] Assignee: A/S Kongsberg Vapenfabrikk, Kongsberg, Norway

[21] Appl. No.: 120,351

[22] Filed: Feb. 11, 1980

[30] Foreign Application Priority Data

Feb. 16, 1979 [NO] Norway ............................... 790531

[51] Int. Cl.³ ............................................ F16M 13/00
[52] U.S. Cl. ...................................... 248/563; 248/565
[58] Field of Search ............... 248/563, 565; 267/8 R, 267/140.1; 188/282, 312

[56] References Cited

U.S. PATENT DOCUMENTS

| | | | |
|---|---|---|---|
| 1,937,358 | 11/1933 | Rippingille | 188/282 |
| 1,949,064 | 2/1934 | Nathan | 248/563 |
| 2,597,800 | 5/1952 | Hussman | 248/565 |
| 3,179,368 | 4/1965 | Whitten et al. | 248/563 |
| 3,249,330 | 5/1966 | Preis | 248/563 |
| 3,351,314 | 11/1967 | Hirsch et al. | 248/563 |
| 3,450,235 | 6/1969 | Lohr | 188/282 |

FOREIGN PATENT DOCUMENTS

| | | | |
|---|---|---|---|
| 588137 | 5/1947 | United Kingdom | 248/565 |
| 803806 | 11/1958 | United Kingdom | 248/565 |

Primary Examiner—William H. Schultz
Attorney, Agent, or Firm—Holman & Stern

[57] ABSTRACT

Delicate equipment is mounted on a carrier such as a vessel or a vehicle by means of shock absorbers which are spring biased to an accurately defined position in which the equipment is rigidly fastened to the carrier. When the carrier is subjected to a shock force exceeding the biasing of the shock absorbers, the rigid connection is released and the equipment thus protected against damaging forces.

Each shock absorber has a single compression spring which is compressed by an axial force on the shock absorber regardless of the direction of the force.

At least three parallel, vertical shock absorbers carry the equipment. Horizontal shocks are absorbed due to the tilting movement of the equipment relative to the shock absorbers, which are thus subjected to vertical movements in opposite directions.

4 Claims, 3 Drawing Figures

SHOCK ABSORBER ARRANGEMENT FOR MOUNTING DELICATE EQUIPMENT AND SHOCK ABSORBER FOR USE IN THE ARRANGEMENT

BACKGROUND OF THE INVENTION

1. Field of the Invention

The present invention relates to a shock absorber arrangement for mounting delicate equipment on a carrier such as a vessel or a vehicle in such a manner that the equipment is normally rigidly connected to the carrier in a predetermined position relative thereto, but is permitted to yield as a result of shocks involving an acceleration beyond a certain limit, whereupon it is forced back into said predetermined position.

The invention also relates to a shock absorber for use in such an arrangement.

When three-axes stabilized instruments such as navigation equipment comprising a gyro are mounted on board ships, it is important that the equipment when in use has an accurately defined postion with respect to the ship. However, when the equipment is completely rigidly mounted, it may suffer damage from shock loads, for instance due to an under-water explosion. It is therefore desirable to mount the equipment in such a manner that is is normally rigidly connected to the ship, but is permitted to yield as a result of shocks or vibrations of the ship involving an acceleration beyond a certain limit, thus protecting the equipment against excessive shock forces. This may be obtained by including a biased spring which releases the locking of the equipment in the desired position when the forces on the equipment exceed the biasing force. When the load is reduced the equipment should automatically and without excessive oscillations return to the desired predetermined position. This result may conveniently be obtained by means of mating conical surfaces which are forced into self-centering engagement with each other by means of the biased spring.

2. Description of the Prior Art

Thus, from German Auslegeschrift No. 1 578 306 it is known to mount a periscope tube in an annular housing on a vehicle. In the housing, which surrounds the periscope, there are mounted three circumferentially spaced spring-biased bolts extending parallel to the axis of the periscope column and having conical fitting and locking surfaces for engagement with three holes in a flange on the periscope column. The bolts are spring biased not only with respect to the housing but through a further spring also with respect to a second flange on the periscope column, whereby shocks can be absorbed in both directions along the axes of the bolts while compressing respective springs. Lateral forces are accommodated by compression of both springs by axial movement of the bolts due to a wedge effect against the conical locking surface. The bolts are mounted for axial movement in guide bores in the housing, and the accuracy of the position of the periscope tube in the housing in the noraml position thus depends on the fit between the guide bores and the bolts.

The object of the present invention is to provide a mounting of the kind initially referred to, which may be obtained by means of compact, light-weight and space-saving shock absorbers which are simple to mount and which in a simple manner may be arranged so as to absorb both vertical and horizontal shock loads.

SUMMARY OF THE INVENTION

The shock absorber arrangement according to the invention is characterized in that it comprises three separate, self-contained, identical shock absorbers which all act in both directions along a vertical axis and carry the equipment at a level different from that of the centre of gravity of the equipment, whereby horizontal shocks result in a tilting movement and thus a vertical load in opposite directions on the shock absorbers.

This, of course, requires shock absorbers which permit a certain tilting movement or inclined position of the equipment relative to the carrier on which the equipment is mounted, without adversely effecting the centering or alignment accuracy.

A shock absorber for use in the arrangement referred to above comprises a piston-like element having an outer conical surface which by means of a biased spring is forced into self-centering engagement with a corresponding inner conical surface on a second element, and the shock absorber is characterized in that the opposite end of the spring engages an abutment element having an engaging surface which by the spring is forced towards a corresponding engagement surface on said second element, which formes a sleeve-like housing in which a spring is arranged, and is adapted to be adjustably mounted on the carrier, and that a shaft-like element which extends axially through the housing and displaceably through the piston element and the abutment element, respectively, at both ends of the housing and which is adapted to be connected to the equipment to be mounted, engages axially outwardly directed engagement surfaces on the piston element and the abutment element, whereby relative axial movement between the shaft and the housing can take place in both directions by movement of either the abutment element or the piston element inwardly in the housing with concomitant compression of the spring between these elements.

Preferably, the surface on the abutment element or member engaging the housing is spherical, and the outer diameter of the piston element is smaller than the inner diameter of the housing to allow the shaft to be inclined relative to the axis of the housing. Additionally, the shaft may be connected to the equipment through a head which can adjust itself into a slightly inclined position in any direction relative to the axis of the shaft. Thereby it becomes possible for the equipment to tilt when subjected to large lateral acceleration. Such a tilting will change the centre distance between the attachment points of the equipment (for instance a stabilized platform) and the shafts in the three absorbers when viewed in the axial direction of the three absorbers.

An embodiment of a shock absorber and an arrangement according to the invention will be described in more detail below, reference being had to the drawing.

DESCRIPTION OF THE PREFERRED EMBODIMENT

Figure 1:
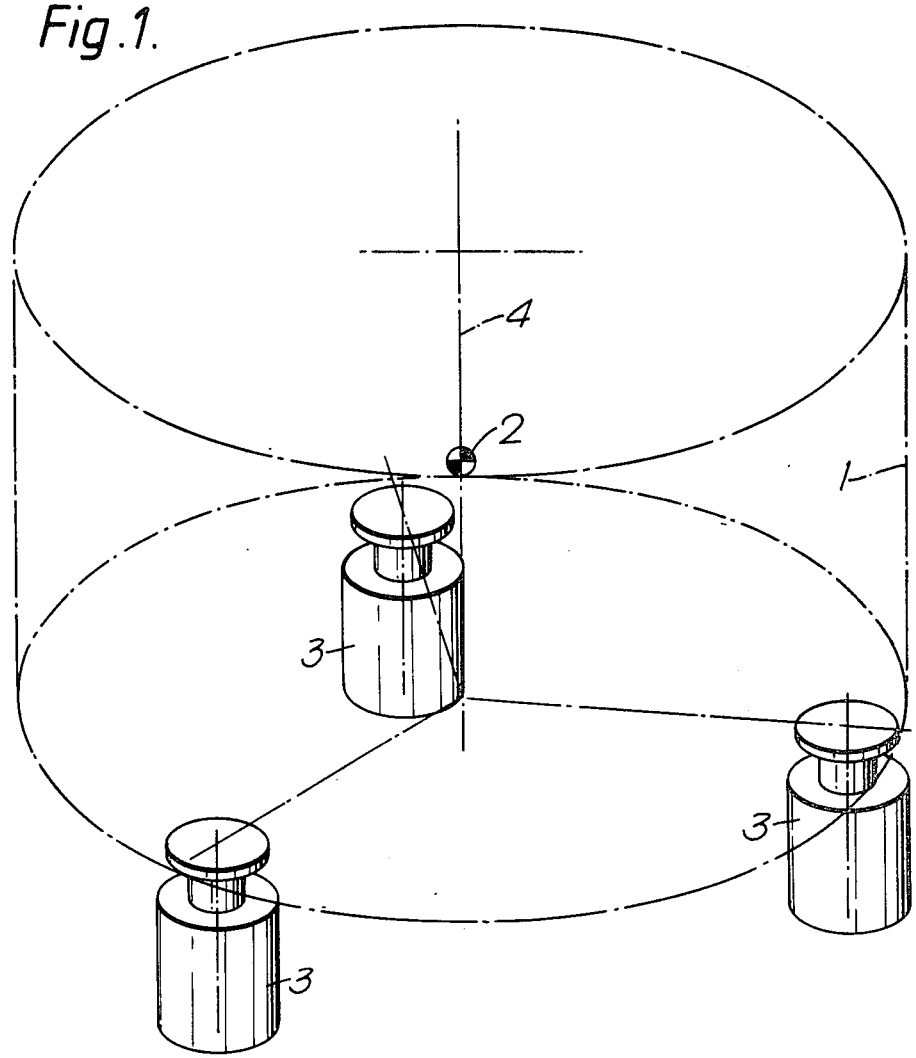
FIG. 1 illustrates diagrammatically how an equipment may be mounted on three parallelly arranged shock absorbers according to the invention.

As illustrated in FIG. 1, an equipment, the outline of which is indicated in dashed lines at 1, and the centre of gravity of which is indicated at 2, may be mounted on three shock absorbers 3. As will be seen each of the three shock absorbers 3 is mounted with its axis parallel to the vertical axis 4 through the centre of gravity 2 of the equipment. The shock absorbers carry the equipment or a platform therefor in a horizontal plane which lies below the centre of gravity 2. As will be explained later, the shock absorbers 3 are effective in their axial direction, and it will then easily be understood that they may provide a yielding mounting of the equipment in the vertical direction. However, due to the mounting of the shock absorbers in a plane below the center of gravity 2, a yielding mounting with respect to horizontal forces will also be obtained, since forces attacking a body may be presumed to attack in the centre of gravity of the body, as well known. Thus, horizontal forces will be transformed to a moment which is larger or smaller according to the distance of the centre of gravity from the mounting plane of the shock absorbers 3, said moment resulting in axial movements of the shock absorbers which are circumferentially spaced around the vertical axis 4. By adjustment of the position of the shock absorbers relative to the centre of gravity 2 it is thus possible with the same shock absorbers to obtain a varying sensitivity to accelerations in the vertical and the horizontal directions, respectively.

Figure 2:
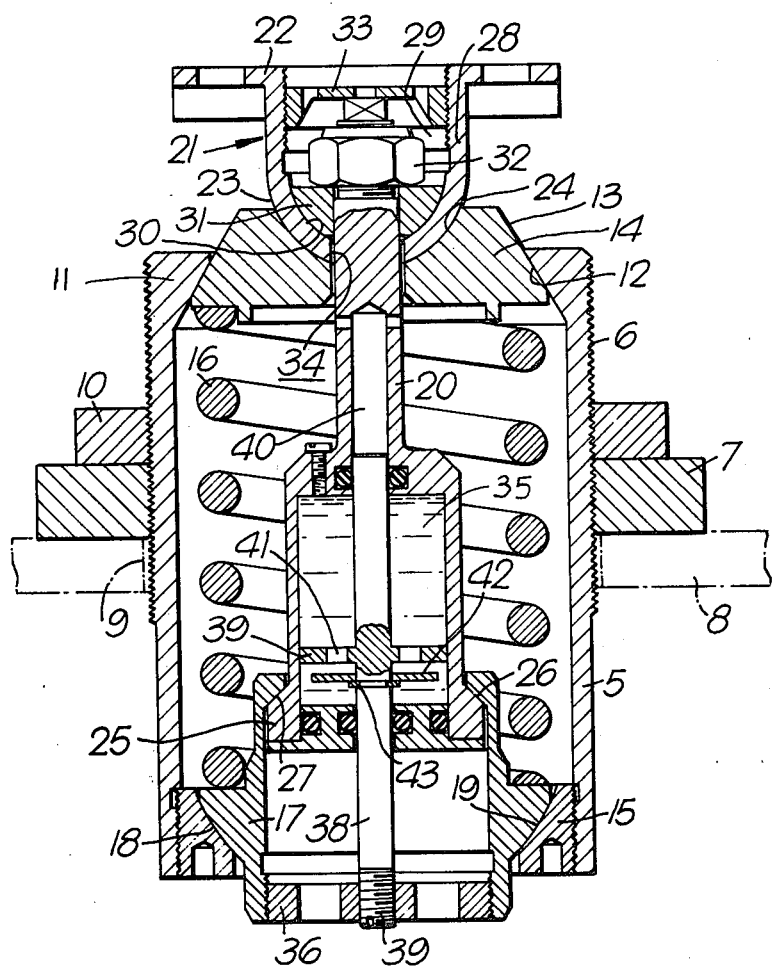
FIG. 2 is a vertical section through one of the shock absorbers in FIG. 1.

The constructure of each shock absorber 3 is best illustrated in the longitudinal section in FIG. 2. The shock absorber comprises a housing 5 which over at least a part of its outer surface is provided with threads 6. Onto these threads 6 is threaded a mounting flange 7 for rigid mounting of the housing 5 on a carrier 8 such as a ship. The bolt connection between the mounting flange 7 and the carrier 8 may be of a kind permitting lateral adjustment of the housing 5, which is inserted in an opening 9 having a larger diameter than the outer diameter of the housing. Vertical adjustment of the housing 5 relative to the carrier 8 is obtained by adjusting the mounting flange 7 on the threads 6. A locking nut 10 serves to lock the mounting flange 7 in the correct position.

At its upper end the housing 5 has an inwardly projecting shoulder or flange 11 having a conical engagement surface 12 co-operating in a self-centering manner with an outer conical engagement surface on a disc-shaped or piston-like element 14. At the opposite end the housing 5 has a similar inwardly protruding flange 15 which with a view to permit the shock absorber to be assembled is made as a separate ring which is threaded into the housing 5.

The engagement surfaces on the flange 11 and the piston 14 are forced into self-centering engagement with each other by means of a biased compression spring 16, the opposite end of which engages an abutment element or member 17 having an engagement surface 18 engaging a corresponding engagement surface 19 on the ring 15. Whereas the engagement surfaces 12 and 13 are conical, the engagement surfaces 18 and 19 are spherical in order to permit a certain tilting movement of the abutment member 17 relative to the ring 15 in the housing 5.

A shaft-like element 20, which at its lower end is enlarged to form a hydraulic oscillation dampening chamber which will be described in more detail later, extends axially through the housing 5 and out through openings in the abutment member 17 and the piston element 14, respectively. The upper end of the shaft element 20 is provided with a head 21 having a plate 22 to which the equipment to be mounted may be bolted. The head 21 forms an enlarged spherical engagement surface 23 engaging a corresponding axially outwardly directed engagement surface 24 on the piston element 14. The lower end of the shaft 20 also has an enlarged portion 25 having an engagement surface 26 for engagement with an axially outwardly directed engagement surface 27 on the abutment member 17.

As illustrated in FIG. 2 the head 21 has the shape of an inverted hat having a recessed centre portion 28, the lower side of which forms the engagement surface 23. The recess 29 formed by the centre portion has a bottom 30 which is spherical and concentric with the engagement surface 23. The head 21 is connected to the shaft element 20 by means of a clamping piece 31, a nut 32 and a cover 33. The clamping piece 31 has a spherical lower face which mates the bottom 30 of the recess 29 and is kept in engagement therewith by the nut 32, which is self-locking. The cover 33 is threaded into the recess into a position in which it almost engages the top of the shaft element 20. The clamping piece 31 and the nut 32 will thus prevent the head 21 from moving in the upward direction on the shaft 20, whereas the cover 33 will prevent the head 21 from moving any substantial distance downwardly on the shaft element. However, due to the spherical engagement surfaces 23, 24 and 30 the head 21 may take a somewhat inclined position relative to the shaft element 20 in any direction. To permit such an inclined position a bore 34 in the head 21 for passage of the shaft 20 through the head has a somewhat larger diameter than the outer diameter of the shaft 20 and the cover 33 is not threaded fully down onto the top of the shaft 20. The nut 32 must be tightened so as to provide a narrow fit for the centre portion 23 of the head 21 between the clamping piece 31 and the piston element 14. However, the nut must not be tightened so as to force the piston element 14 downwardly away from engagement with the conical engagement surface 12 on the housing 5. In practice it has proven that such an adjustment of the nut 32 is possible without difficulty.

When the carrier 8 is subjected to vertical shock loads beyond a certain limit, the housing 5 which is secured to the carrier, and the shaft element 20 which is secured to the equipment to be mounted, will move relative to each other. If the head 21 is moved downwardly by a force exceeding the biasing force of the spring 16, the piston element 14 will move downwardly in the housing 5. Thereby the engagement between the engagement surfaces 12 and 13 and thus the rigid connection between the head 21 and the carrier 8 will be broken. When the downwardly directed force on the head 21 is removed, the spring 16 will force the piston element 14 back into full engagement with the housing 5, and the engagement surfaces 12 and 13 will see to it that the relative position of the housing 5 and the piston element 14 will be exactly the same as before the shock. If the head 21 is lifted upwardly, it will carry along with it the shaft element 20 through the clamping piece 31 and the nut 32. The head 25 at the lower end of the shaft element 20 will lift the abutment member 17 upwardly in the housing 5 and again compress the spring 16. When the lifting force on the shaft 20 comes to an end or is reduced below the biasing force of the spring 16, the spring will again force the abutment member 17 downwardly into engagement with the engagement surface 18.

Unless the return movement is dampened, the shaft element 20 may make several upward and downward movements before the shock abosrber comes to a rest in its normal position. In order to prevent such movements there is, as already mentioned, included a hydraulic dampening device which will now be described. Thus, in the lower part of the shaft element 20 there is a hydraulic chamber 35 which is filled with a suitable liquid. Into the lower end of the abutment member 17 there is threaded a disc 36 having a central threaded bore 37 which adjustably engages a threaded piston rod 38 which extends into the chamber 35 and within this chamber is provided with a piston 39. The piston rod 38 further extends through the chamber 35 and into a guide boring 40 in the shaft element 20. Between the piston 39 and the walls of the chamber 35 there is a small clearance to permit a controlled flow of liquid between the walls and the piston. Further, the piston has valve openings 41 which act as a check valve, the openings being closable by a valve plate 42, the movement of which is restricted by a locking ring 43.

Figure 3:
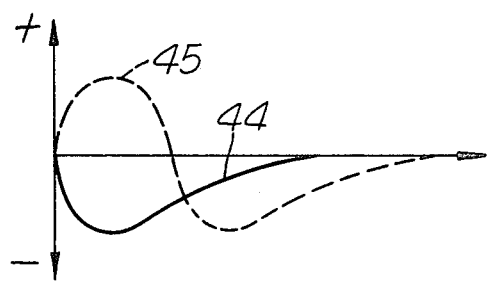
FIG. 3 diagrammatically illustrates the oscillation of a shock absorber according to the invention including an oscillation dampener.

When the head 21 on the shaft 20 moves downwardly, the cover 33 will carry with it the shaft 20, which thus will move relative to the piston rod 38 which is fastened to the abutment member 17. The liquid in the chamber 35 will flow through the valve openings 41, and the piston 39 will therefore not impede the movement of the shaft 20 in the downward direction. However, when the shaft 20 is returned, the valve plate 42 will close the valve openings 41, and the shaft 20 can therefore only move upwardly with a speed which is governed by the possibility of the liquid in the chamber 35 to pass the piston 39. The return movement will therefore take place somewhat slower and more controlled and not cause any bouncing when the engagement surfaces 12 and 13 engage each other in a self-centering fashion. The movement of the shaft 20 as a function of time when the shaft 20 is first moved downwardly is illustrated by the curve 44 drawn in full lines in FIG. 3.

When the initial movement of the shaft element 20 is in the upward direction the shaft element 20 will carry with it the abutment member 17 and thereby the piston rod 38. Thus, no dampening effect from the dampening device is obtained. When after termination of the acceleration of the shaft element 20 the abutment member 17 is returned to engagement with the engagement surface 18 by means of the spring 16, forces of inertia will, however, make the shaft element 20 continue its movement downwardly. Thereby the spring 16 will again be compressed, since also the piston element 14 will move downwardly. Thereby a movement and a manner of operation of the shock absorber is initiated, which corresponds to the one taking place when the head 21 is initially forced down into the housing 5. During this movement the oscillation dampening device will thus be put into operation to dampen the return movement of the piston element 14 into engagement with the engagement surface 12. The movement of the shaft element 20 as a function of time when the initial movement is in the upward direction, is illustrated by the dashed line 45 in FIG. 3. As will be seen, the portion of the curve below the neutral axis corresponds to the curve 44.

It will be understood that the oscillation dampening device may be constructed in various manners other than that shown in the drawing, as commonly known.

When the centre of gravity of the equipment to be mounted above the shock absorbers is subjected to horizontal forces, a movement will be created which leads to axial forces in the shock absorbers. Therefore, the manner of operation of the shock absorbers will be approximately the same as during vertical shocks. However, a certain difference is induced because the equipment will tilt and place the plates 22 on the heads 21 in a somewhat inclined position. This is permitted because of the ability of the heads to move relative to the shafts 20. The tilting will also lead to a somewhat smaller centre distance between the heads, and also this smaller distance must be permitted by the shock absorbers. The required lateral movement is accommodated by the shock absorber or absorbers the piston 14 of which moves downwardly in the housing. In fact, the housing has an inner diameter which is larger than the outer diameter of the spring 16 and the piston 14, so that the piston may move laterally when moved away from the engagement surface 12.

Since the shock absorber arrangement according to the invention is based upon detached separate shock absorbers, a very flexible mounting of the equipment to be protected is obtained. It is thus very simple to dismount an equipment (for instance a stabilized platform) and replace it with new equipment without having to make subsequent adjustments of the shock absorbers in the vertical and lateral directions.

The shock absorber provides a large degree of freedom with respect to proper mounting relative to the centre of gravity of the equipment to be mounted. In practice this means that the same shock absorber may be used even when the ratio between the vertical and the horizontal forces which are to activate the shock absorber, is changed.

Since the shock absorber is constructed as a closed unit, it is able to withstand severe conditions with respect to environment and temperature, especially if made by corrosion resistant materials. If desired, a bellows-like sleeve may be inserted between the plate 22 and the housing 5 to prevent foreign matter from entering the interior of the housing 5 when the piston element 14 moves away from the engagement surface 12.

Since the same spring element is compressed regardless of the direction of the shock, the same spring characteristics in both directions are obtained. Apart from or in addition to a spring element in the form of a helical spring 16 disc springs or elastomer springs (strained on compression or shearing), if desired together with dampening joints.

The shock absorber is designed to return to its initial position within very narrow tolerances. This is ensured by the conical engagement surfaces 12 and 13. This structure avoids a highly precise machining of fitting surfaces between a boring and a bolt.

The total result is that the shock absorber according to the invention may be manufactured relatively cheap and provide a shock absorber arrangement which is flexible with respect to mounting and positioning, at the same time being compact, having a small weight and requiring little space. The arrangement is also easy to adjust. It can easily be included in already existing equipment and adapted to extreme environments. The alignment accuracy is excellent without requiring expensive machining operations.

What I claim is:

1. Shock absorber arrangement for mounting delicate equipment on a carrier such as a vessel or vehicle in such a manner that the equipment is normally rigidly connected to the carrier in a predetermined position relative thereto, but is permitted to yield as a result of shocks involving an acceleration beyond a certain limit, whereupon it is forced back into said predetermined position, characterized in that the arrangement comprises three separate, self-contained, identical shock absorbers which all act in both directions along a vertical axis and carry the equipment at a level different from that of the centre of gravity of the equipment, whereby horizontal shocks result in a tilting movement and thus a vertical load in opposite directions on the shock absorbers, comprising a piston-like element having an outer conical surface which by means of a biased spring is forced into self-centering engagement with a corresponding inner conical surface on a second element, characterized in that the opposite end of the spring engages an abutment element having an engagement surface which by the spring is forced towards a corresponding engagement surface on said second element, which forms a sleeve-like housing in which the spring is arranged, and is adapted to be adjustably mounted on the carrier, and that a shaft-like element which extends axially through the housing and displaceably through the piston element and the abutment element, respectively, at both ends of the housing and which is adapted to be connected to the equipment to be mounted, engages axially outwardly directed engagement surface on the piston element and the abutment element, whereby the relative axial movement between the shaft and the housing can take place in both directions by movement of either the abutment element or the piston element inwardly in the housing with concomitant compression of the spring between these elements.

2. Shock absorber according to claim 1, characterized in that the surface on the abutment element engaging the housing is spherical and the outer diameter of the piston element is smaller than the inner diameter of the housing to allow the shaft to be inclined relative to the axis of the housing.

3. Shock absorber according to claim 1 or 2, characterized that the shaft is connected to the equipment through a head which can adjust itself to a slightly inclined position in any direction relative to the axis of the shaft.

4. Shock absorber according to any of the claim 1 or 2 characterized in that an oscillation dampener is associated with the shaft to dampen the movement between said shaft and the abutment member.

* * * * *